United States Patent
Walker

(10) Patent No.: US 10,970,996 B1
(45) Date of Patent: Apr. 6, 2021

(54) SYSTEM FOR AUTOMATICALLY OPENING A LID TO A GRAIN BIN

(71) Applicant: 2320 Solutions, LLC, Cedar Rapids, IA (US)

(72) Inventor: Justin Walker, Cedar Rapids, IA (US)

(73) Assignee: 2320 SOLUTIONS, LLC, Cedar Rapids, IA (US)

( * ) Notice: Subject to any disclaimer, the term of this patent is extended or adjusted under 35 U.S.C. 154(b) by 0 days.

(21) Appl. No.: 16/449,657

(22) Filed: Jun. 24, 2019

Related U.S. Application Data

(60) Provisional application No. 62/702,013, filed on Jul. 23, 2018.

(51) Int. Cl.
| | | |
|---|---|---|
| G08C 17/02 | (2006.01) | |
| H04B 17/318 | (2015.01) | |
| B65D 90/10 | (2006.01) | |
| A01F 25/16 | (2006.01) | |
| E04H 7/22 | (2006.01) | |

(52) U.S. Cl.
CPC ............. *G08C 17/02* (2013.01); *A01F 25/16* (2013.01); *B65D 90/10* (2013.01); *E04H 7/22* (2013.01); *H04B 17/318* (2015.01)

(58) Field of Classification Search
CPC ...... B65D 90/10; G06K 7/10366; E04H 7/22; Y02A 40/55; A01F 12/46; A01D 41/1217
See application file for complete search history.

(56) References Cited

U.S. PATENT DOCUMENTS

| | | | |
|---|---|---|---|
| 2009/0288606 A1* | 11/2009 | Zimmerman | A01K 5/0225 119/51.02 |
| 2016/0306955 A1* | 10/2016 | Martin | G06F 21/35 |
| 2017/0073156 A1 | 3/2017 | Neufeld et al. | |
| 2018/0313131 A1 | 11/2018 | Matye | |

* cited by examiner

*Primary Examiner* — Daniell L Negron
(74) *Attorney, Agent, or Firm* — Shuttleworth & Ingersoll, PLC; Jason Sytsma

(57) ABSTRACT

A system for automatically opening a lid to a grain bin with controller in communication with an actuator for receiving a signal containing a data packet to activate the actuator. An RFID is combined to an unloading device for transmitting the data packet to the controller when the RFID is positioned proximate to the controller. The controller compares the device id with a stored identification value and upon a match the controller activates the actuator to open the lid of the grain bin.

18 Claims, 5 Drawing Sheets

SYSTEM FOR AUTOMATICALLY OPENING A LID TO A GRAIN BIN

CROSS-REFERENCE TO RELATED APPLICATIONS

The present application claims the benefit of U.S. Provisional Patent Application No. 62/702,013 filed Jul. 23, 2018, the contents of which are incorporated herein by reference.

TECHNICAL FIELD

This disclosure relates to improvements in grain bins, and, more specifically, this disclosure relates to a system for automatically opening a lid to a grain bin.

BACKGROUND INFORMATION

Current feed delivery systems rely on operators to exit the vehicle to open the bulk feed bin lid in order to offload feed. As an operator exits the vehicle, there are potential risks to the operator and the livestock at each site. These risks include, for example, the spread of contaminants between bin sites and the operator falling off the bin or off the feed delivery vehicle.

Conventional grain bins have a circular side wall with a conical roof. An opening is provided in the apex of the roof through which grain can be loaded via an unloading device, such as an auger or conveyor belt. A lid is pivotally connected to the roof to move between open and closed positions relative to the roof opening. The lid is normally closed, and can be opened by a rope tied to a handle on the lid and extending down to the ground, so that an operator can pull on the rope to open the lid approximately 90°. To maintain the lid in the open position, the rope is tied to an object near the ground, such as a leg or other structure near the base of the grain bin. A torsion spring on the lid closes the lid from the open position to cover the roof opening when the rope is released. If the rope breaks or becomes disconnected from the lid, someone has to climb to the top of the bin to install a new rope on the lid.

Improvements have been made to automate the opening of the lid, but these automation technologies still require someone outside the vehicle to push a button on a remote control to open the lid. If someone is not readily on hand to operate the remote control, the driver must get out to do it, which leads to the same problems of a manually operated lid with the spread of contaminants or the injury of the driver.

Accordingly, there is a need for a device, systems, and method for automatically opening the lid to a grain bin.

SUMMARY

In accordance with one aspect of the present invention, disclosed is a system for automatically opening a lid to a grain bin. The system comprises of an actuator combined to the lid of the grain bin. A controller is in communication with the actuator for receiving a signal containing a data packet to activate the actuator. An RFID is combined to an unloading device for transmitting the data packet to the controller when the RFID is positioned proximate to the controller. The controller compares the device id with a stored identification value and upon a match the controller activates the actuator to open the lid of the grain bin.

In further implementations, the RFID is a Bluetooth Low Energy (BLE) transmitter adapted for transmitting the data packet comprising the device id. The data packet from the RFID must have a signal strength as measured by the controller that exceeds a predefined threshold value before the controller actuates the actuator to open the lid of the grain bin. As, the unloading device and the RFID are moved away from the controller and the signal strength as measured by the controller drops below the predefined threshold value a spring combined to the lid returns the lid of the grain bin to the closed position. Alternatively, the RFID can be a passive RFID adapted for transmitting the data packet comprising the device id to the controller.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
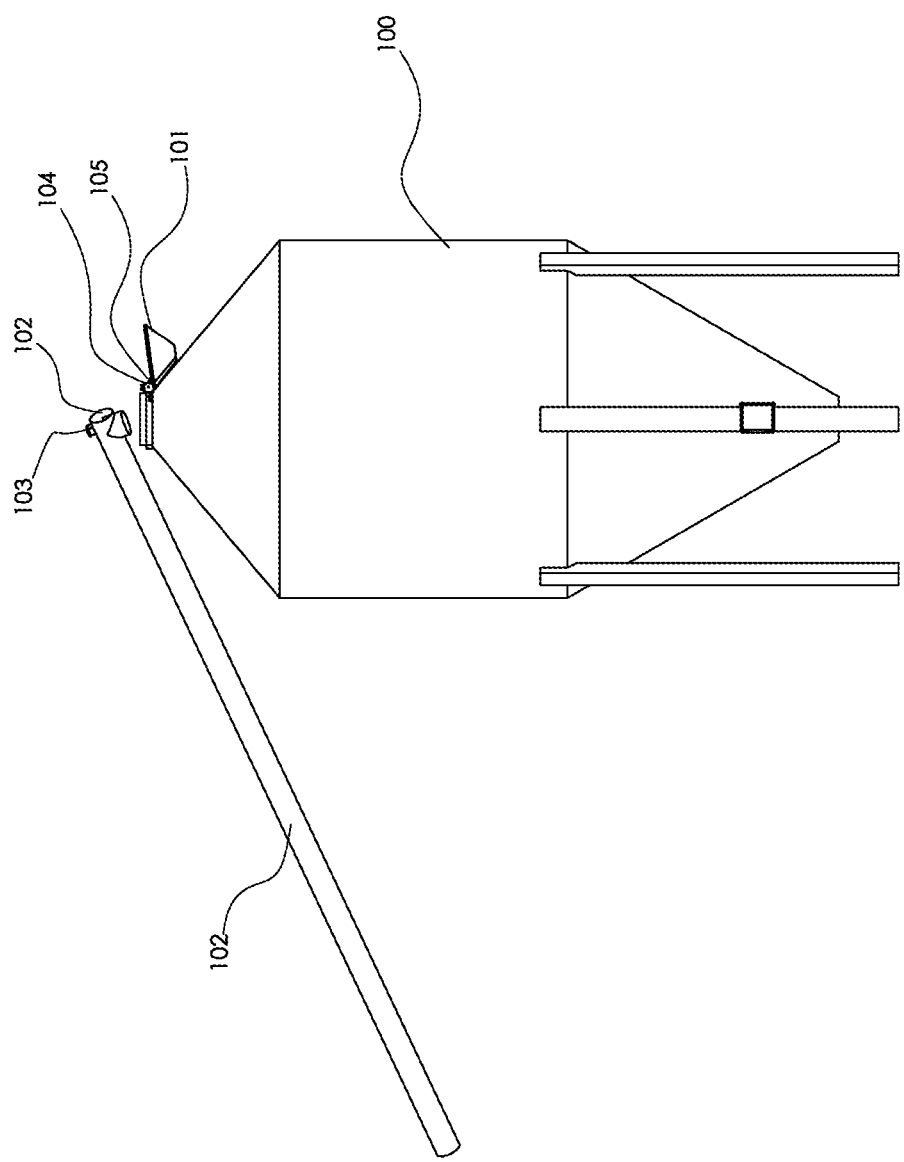
FIG. 1 is a schematic of the feed delivery vehicle's unloading device positioned above a bulk feed bin.

Referring to FIG. 1, shown is a system for automatically opening a lid 101 to a feed bin 100. Lid 101 is automated to open when a radio-frequency identification device RFID 103 on feed delivery vehicle's unloading device 104 gets within a predetermined distance to lid 101 or on command by a mobile device or by the original operating mechanism of lid 101. Any existing lid 101 can be retrofitted with the system herein described to open automatically.

More generally, feed bin 100 is adapted for storing dry feed for later use. Feed bin 100 can be any type of known or later developed feed bin used for storing bulk feed. Feed bin 100 can come in a variety of shapes and size, such as the conventional feed bins with a circular side wall and a conical roof and a conical floor with the structure propped up with leg bracings, as shown in FIG. 1. Feed bin 100 has an opening 102 optionally coverable by lid 101 at the apex of the conical roof through which grain can be loaded via unloading device 104, such as an auger or conveyor belt.

Lid 101 is pivotally connected to the roof to move between open and closed positions relative to opening 102. Lid 101 is normally closed, but can be opened automatically by a command signal from RFID 103 on an unloading device 104 that broadcasts an identification number to identify unloading device 104.

RFID 103 can be an active RFID or passive RFID. An active RFID comprises its own transmitter and power source, and can include, for example, Bluetooth® Low Energy beacons. Bluetooth low energy (BLE) is a wireless technology standard for personal area networks. BLE is targeted for very low power devices, i.e. devices that can run on a coin cell battery for months or years. Under an embodiment, Bluetooth enabled beacons/devices may comprise Bluetooth integrated circuit implementations. Updates to embedded code of a Bluetooth enabled device may be accomplished through firmware over the air upgrades. Mobile device operating systems may natively support the Bluetooth low energy wireless communications protocol. Such operating systems include iOS, Android, Windows Phone and BlackBerry, as well as OS X, Linux, and Windows 8.

RFID 103 can also be a passive RFID, such as tags and microchips. In such embodiments, passive RFID devices do not have a power source or may have a power source but are energized by an external wand or reader passed in close proximity to energize a capacitor within the passive RFID and discharge (i.e. transmit) an RF signal to the reader for an identification of the tag.

Figure 2:
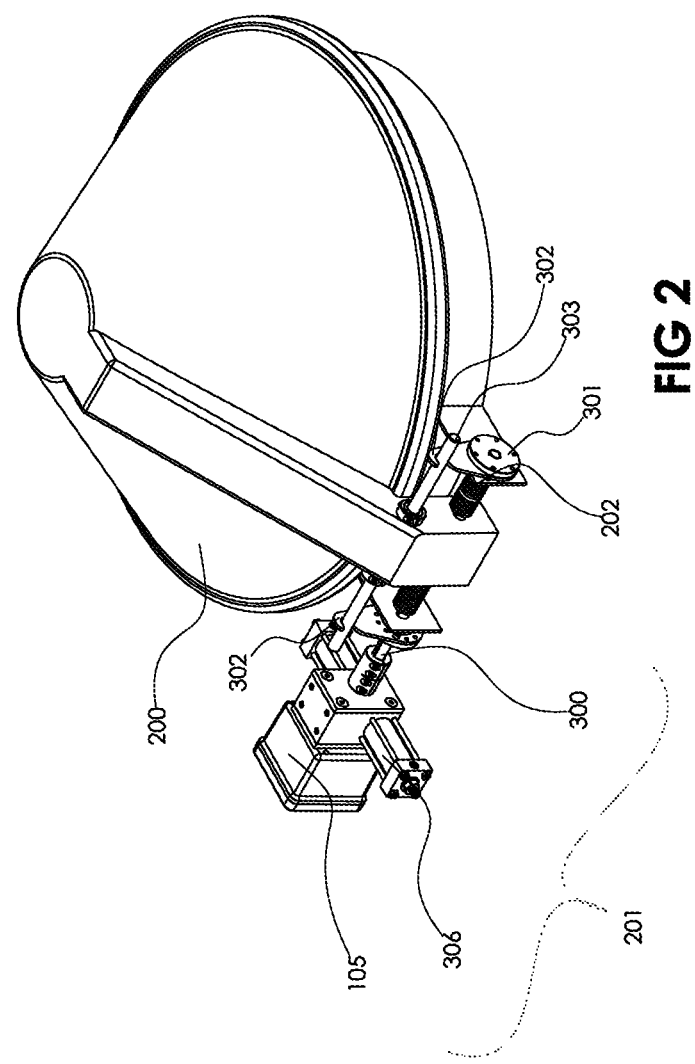
FIG. 2 is a schematic of an auto lid assembly comprising of a bulk feed bin lid and an auto lid mechanism according to this disclosure.
Figure 3:
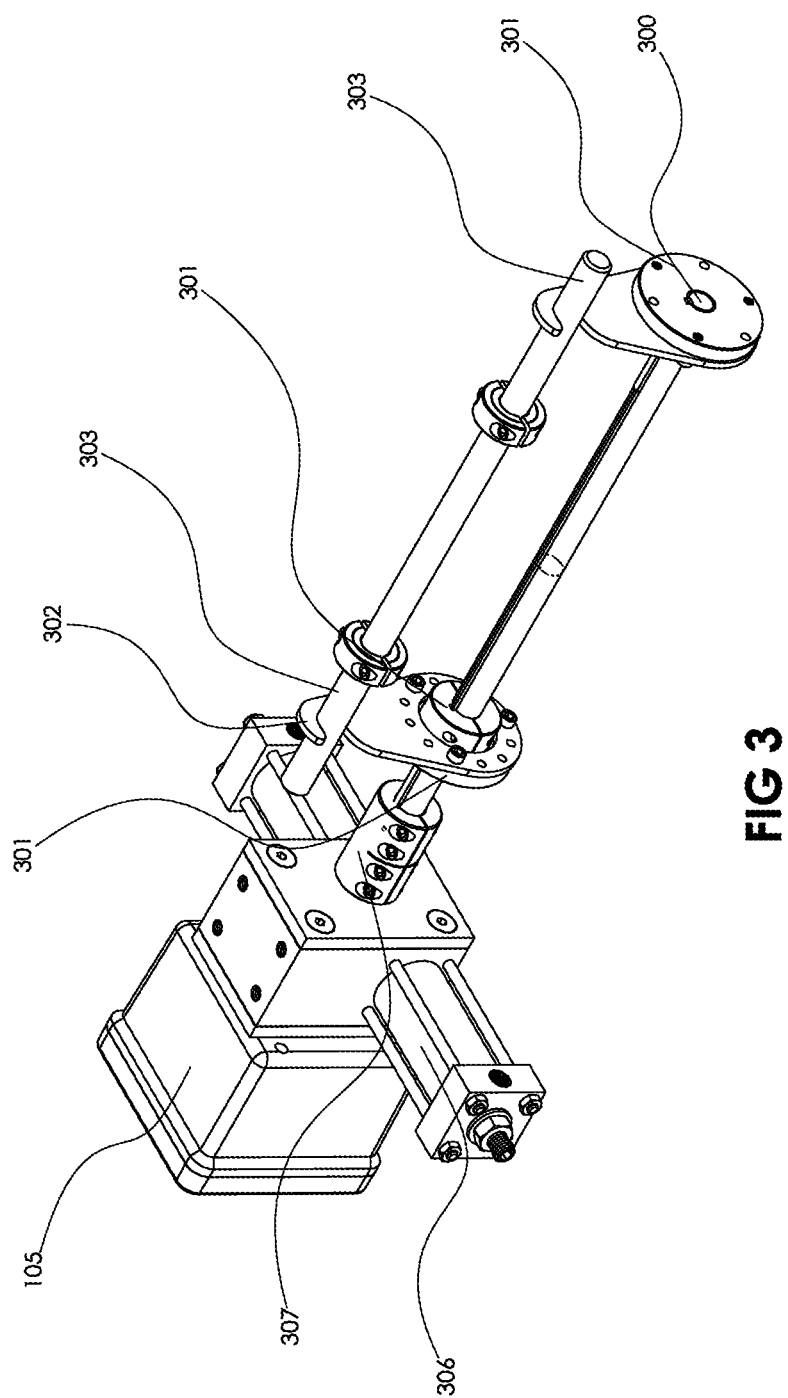
FIG. 3 shows the auto lid assembly of FIG. 2.

FIGS. 1 and 2 show a bin lid assembly 201 attachable to an existing lid 101. Bin lid assembly 201 comprises of an actuator 306 connected to a pivot shaft 300 that rotates at least one swing arm 302 connected to pivot shaft 300 by shaft hubs 301 and cap screws 305. Swing arm 302 catch a lever shaft 303 that is combined to lid 20 to rotate lid 101 to open it.

Bin lid assembly 201 is automated by a controller 105. When an antenna in communication with a receiver 106 in controller 105 (shown in FIG. 5) detects the presence of RFID 103, controller 105 engages actuator 306 of bin lid assembly 201 to open. Once controller 105 no longer detects the presence of RFID, actuator 306 reverses to close lid 101. The closing of lid can be by a return spring 202 that way pre-existing manual opening/closing mechanisms can remain operable or a modification to swing arm 302 such that it encompasses lever shaft 303 to return it automatically.

Figure 4:
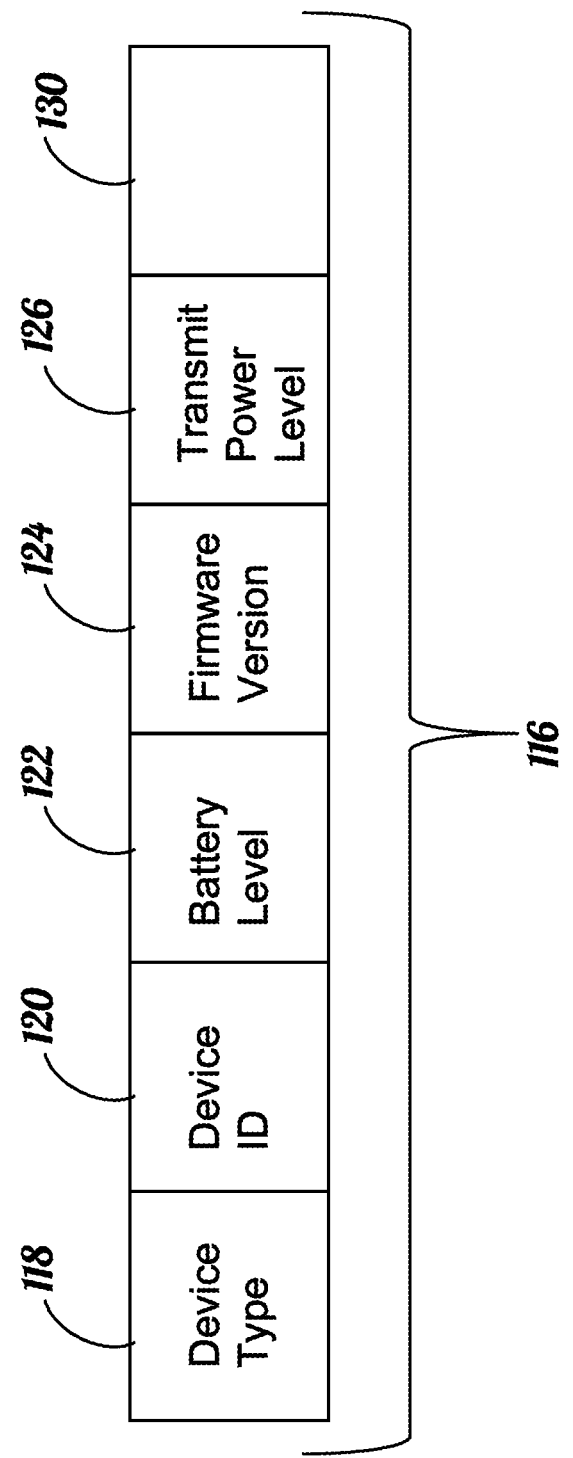
FIG. 4 shows the contents of an RF beacon data packet transmitted from an active RFID on the unloading device.

Controller 105 comprises of an antenna in receiver 106 configured for receiving from RFID 103 on unloading device 104 a signal containing a data packet 116 (shown in FIG. 4). Controller 105 extracts a device id 120 (FIG. 4) from data packet 116. Device id 120 can be any alphanumeric value or symbol. If the device id 120 for RFID 103 matches the identification value store in memory, controller 105 recognizes this as a match and will initiate the process for opening lid 101 to feed bin 100. Controller 105 can store multiple device ids 120 so multiple feed delivery vehicles corresponding to multiple unloading device 104 can open lid 101. As soon as controller 105 receives data packet 116 from RFID 103 with device id 120 matching a string stored within controller 105 and with signal strength within a programmed value, controller 105 will turn on an output actuating actuator 306 of bin lid assembly 201.

FIG. 4 shows the contents of data packet 116 transmitted from active RFID 103 on unloading device 104 to an antenna associated in a controller 105. Data packet 116 can include device type 118, device id 120, battery level 122, firmware version 124, and transmit power level 126. Controller 105 may also extract an estimate of the transmission's signal strength (i.e. received signal strength indication or "RSSI"). Controller 105 may then use the signal strength to estimate a distance from controller 105 to active RFID 103 on unloading device 104. It should also be understood that controller 105 can contain the necessary components of a wand or other instrument necessary to obtain data packet 116 from passive RFID 103.

Figure 5:
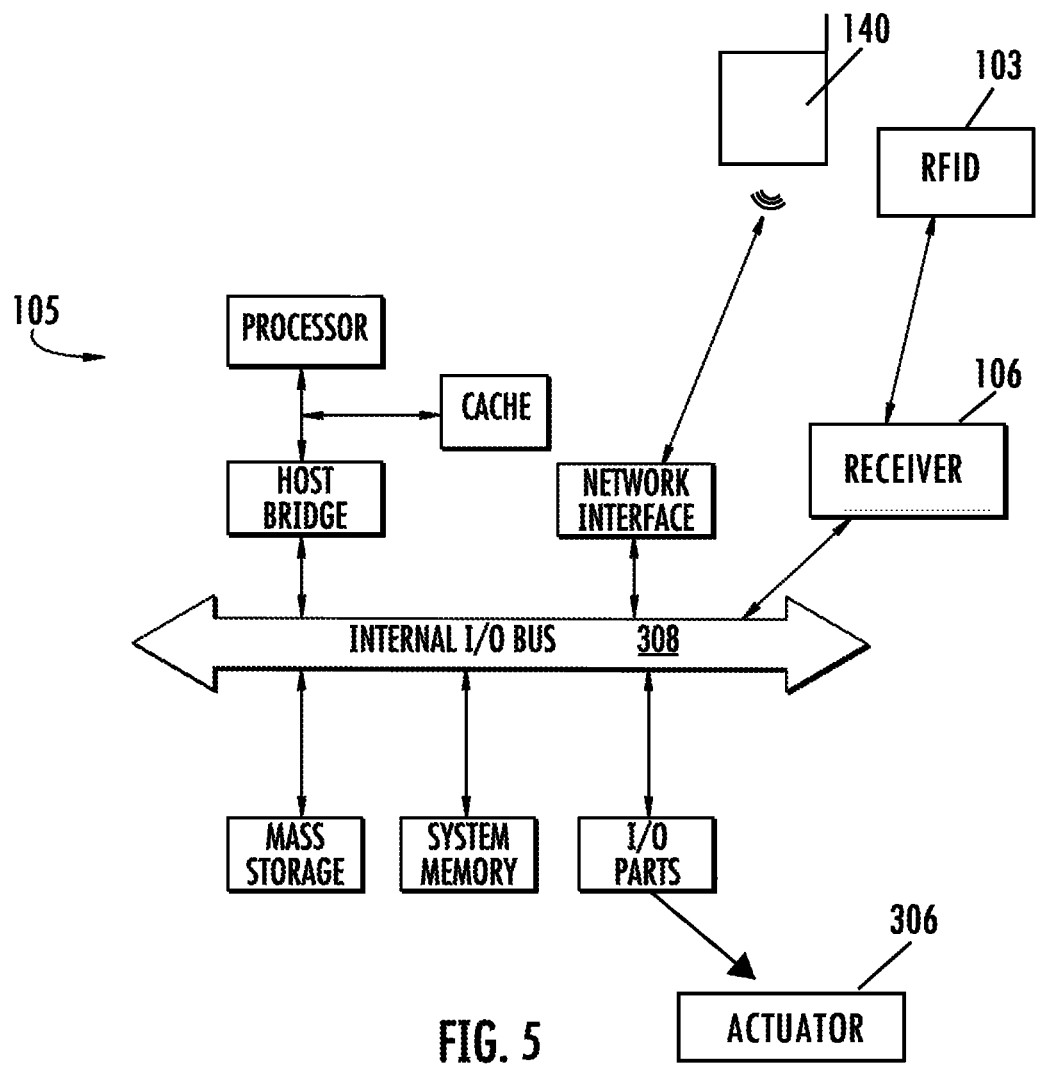
FIG. 5 is a block diagram of a controller for operating the auto lid assembly of FIG. 2.

FIG. 5 shows controller 105 and a mobile device 140 in communication with controller 105. Mobile device 140 can run a smartphone application communicatively coupled to controller 105 through BLE protocol. The smartphone application can also receive data directly from active RFID device 103.

One or more components of the systems and methods for automatically opening lid 101 can comprise any collection of processor-based devices or computing devices operating together, or components of processing systems or devices, as is known in the art. The processing system in controller 105 can include, for example, one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem in controller 105. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods of associating an animal id with its weight can be located together or in separate locations. For example, the antenna can be located in controller 105 or positioned separate from to controller 105 and communicatively coupled to receiver 106. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages. These communication paths can connect, for example, controller 105 with mobile device 140.

Aspects of the systems and methods of automatically opening lid 101 and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs), all of which can be considered as controller 105. Some other possibilities for implementing aspects of the systems and methods of monitoring a subject in a premises and corresponding systems and methods include: microcontrollers with memory (such as electronically erasable programmable read only memory (EEPROM)), embedded microprocessors, firmware, software, etc. Furthermore, aspects of the systems and methods of monitoring a subject in a premises and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A system for automatically opening a lid on the top of a grain bin to receive grain from a unloading device therein to fill the grain bin with the grain, the system comprising:
   an actuator combined to the lid of the grain bin;
   a controller in communication with the actuator for receiving a signal containing a data packet to activate the actuator; and
   an RFID combined to the unloading device for transmitting the data packet to the controller when the RFID is positioned proximate to the controller, and the controller comparing the device id with a stored identification value and upon a match the controller activates the actuator to open the lid of the grain bin to receive grain from the unloading device therein to fill the grain bin with the grain.

2. The system of claim 1, wherein the controller further comprises of a receiver for receiving the signal containing the data packet.

3. The system of claim 1, wherein the RFID is a Bluetooth Low Energy (BLE) transmitter adapted for transmitting the data packet comprising the device id.

4. The system of claim 3, wherein the data packet from the RFID must have a signal strength as measured by the controller that exceeds a predefined threshold value before the controller actuates the actuator to open the lid of the grain bin.

5. The system of claim 4, wherein when the unloading device and the RFID are moved away from the controller and the signal strength as measured by the controller drops below the predefined threshold value a spring returns the lid of the grain bin to the closed position.

6. The system of claim 1, wherein the RFID is a passive RFID adapted for transmitting the data packet comprising the device id to the controller.

7. A system for automatically opening a lid to a grain bin, the system comprising:
   an actuator combined to the lid of the grain bin;
   a controller in communication with the actuator for receiving a signal containing a data packet to activate the actuator;
   an RFID combined to an unloading device for transmitting the data packet to the controller when the RFID is positioned proximate to the controller, and the controller comparing the device id with a stored identification value and upon a match the controller activates the actuator to open the lid of the grain bin;
   a pivot shaft connected to the actuator;
   at least one arm connected to the pivot shaft;
   a spring positioned on the pivot shaft and biased against the lid;
   a lever shaft combinable to the lid; and
   wherein the actuator rotates the pivot shaft to rotate the swing arm on the pivot shaft to engage the lever shaft and rotate the bin lid to the open position and wherein when the actuator rotates the pivot shaft in the other direction the spring returns the lid to the closed position.

8. A system for automatically opening a lid on top of a grain bin to receive grain from an unloading device therein to fill the grain bin with the grain, the system comprising:
   an actuator combined to the lid of the grain bin;
   a controller in communication with the actuator;
   a receiver in communication with the controller and for receiving a signal containing a data packet to activate the actuator; and
   an RFID combined to the unloading device for transmitting the data packet to the receiver when the RFID is positioned proximate to the controller, and the controller comparing the device id with a stored identification value and upon a match the controller activates the actuator to open the lid of the grain bin to receive grain from the unloading device therein to fill the grain bin with the grain.

9. The system of claim 8, wherein the data packet from the RFID must have a signal strength as measured by the controller that exceeds a predefined threshold value before the controller actuates the actuator to open the lid of the grain bin.

10. The system of claim 9, wherein when the unloading device and the RFID are moved away from the receiver and the signal strength as measured by the controller drops below the predefined threshold value a spring returns the lid of the grain bin to the closed position.

11. The system of claim 10, and further comprising:
a pivot shaft connected to the actuator;
at least one arm connected to the pivot shaft;
the spring positioned on the pivot shaft and biased against the lid;
a lever shaft combinable to the lid; and
wherein the actuator rotates the pivot shaft to rotate the swing arm on the pivot shaft to engage the lever shaft and rotate the bin lid to the open position and wherein when the actuator rotates the pivot shaft in the other direction the spring returns the lid to the closed position.

12. The system of claim 9, wherein when the unloading device and the transmission means are moved away from the receiver and the signal strength as measured by the controller drops below the predefined threshold value a spring returns the lid of the grain bin to the closed position.

13. The system of claim 8, wherein the RFID is a Bluetooth Low Energy (BLE) transmitter adapted for transmitting the data packet comprising the device id.

14. The system of claim 8, wherein the RFID is a passive RFID adapted for transmitting the data packet comprising the device id to the controller.

15. A system for automatically opening a lid to a grain bin to receive grain from an unloading device therein to fill the grain bin with the grain, the system comprising:
an actuator combined to the lid of the grain bin;
a controller in communication with the actuator;
a receiver in communication with the controller and for receiving a signal containing a data packet to activate the actuator; and
a transmission means for transmitting the data packet to the receiver combined to the unloading device when the unloading device is positioned proximate to the controller, and the controller comparing information associated with the data packet with a stored information and upon a match the controller activates the actuator to open the lid of the grain bin to receive the grain from the unloading device therein to fill the grain bin with the grain.

16. The system of claim 15, wherein the data packet from the transmission means must have a signal strength as measured by the controller that exceeds a predefined threshold value before the controller actuates the actuator to open the lid of the grain bin.

17. The system of claim 15, wherein the transmission means is a Bluetooth Low Energy (BLE) transmitter adapted for transmitting the data packet comprising the device id.

18. The system of claim 15, wherein the transmission means is a passive RFID adapted for transmitting the data packet comprising the device id to the controller.

* * * * *